(No Model.)
C. W. ROBINSON.
VEHICLE WHEEL.
No. 494,168. Patented Mar. 28, 1893.
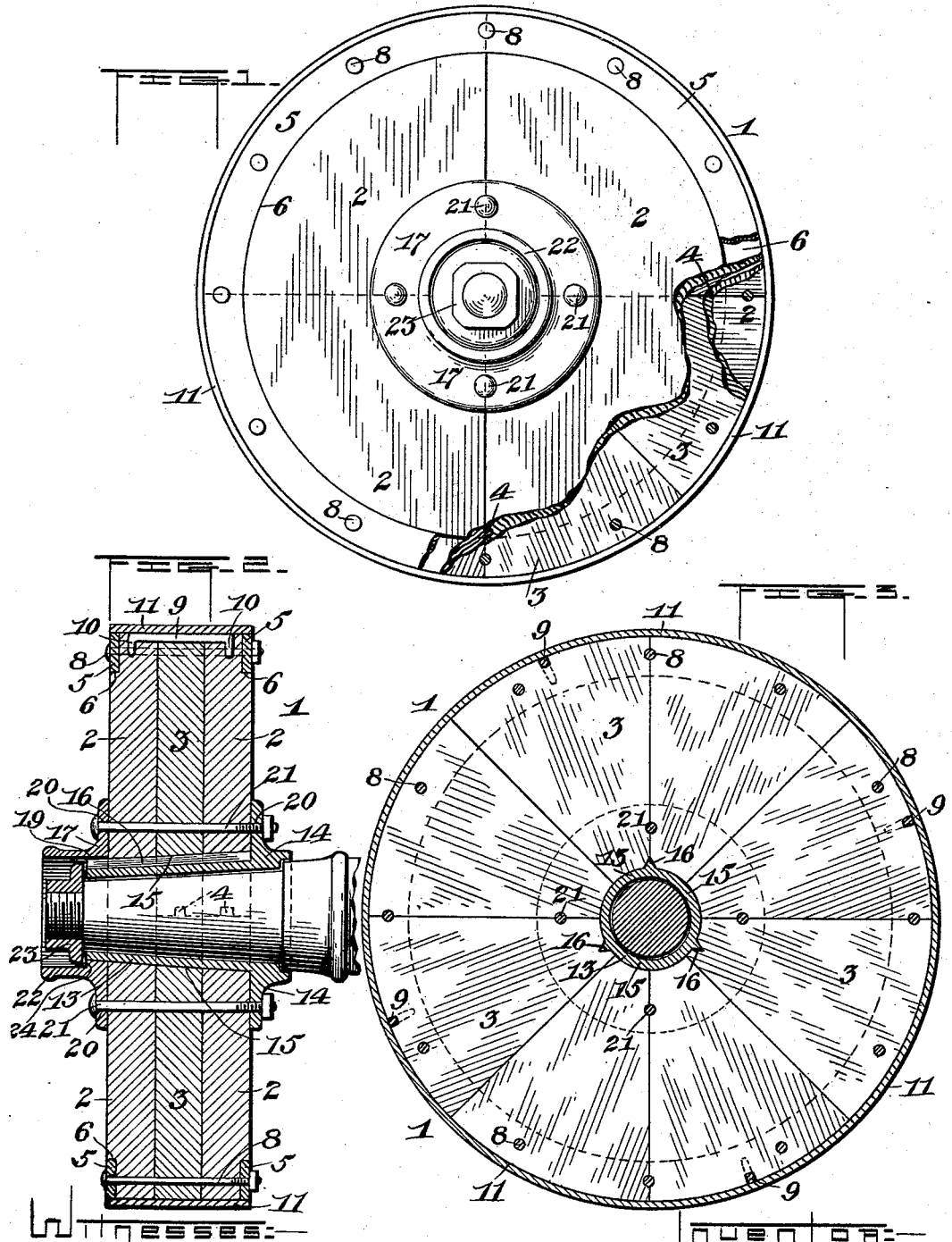

UNITED STATES PATENT OFFICE.

CHARLES W. ROBINSON, OF REED CITY, MICHIGAN.

VEHICLE-WHEEL.

SPECIFICATION forming part of Letters Patent No. 494,168, dated March 28, 1893.

Application filed December 14, 1892. Serial No. 455,164. (No model.)

*To all whom it may concern:*

Be it known that I, CHARLES W. ROBINSON, a citizen of the United States, residing at Reed City, in the county of Osceola and State of Michigan, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has for its object to provide certain new and useful improvements in vehicle wheels, and it relates not only to the construction of a solid wheel but to improvements in the construction of hubs, capable of being used in connection therewith, and for this purpose it consists in the arrangement and combination of the several parts of which it is composed, as will hereinafter be more fully described and claimed.

Referring to the accompanying drawings in which corresponding parts are designated by similar marks of reference, Figure 1 is a side elevation of a wheel constructed in accordance with this invention, a part of the several layers thereof being removed for the purpose of better illustration. Fig. 2 is a section through the center of the said wheel. Fig. 3 is a section taken at right angles to Fig. 2.

The wheel 1 is formed of a plurality of layers of wood, and in the accompanying drawings I have shown it as constructed of three such layers, the layers 2 on each side of the wheel being each cut out of two planks having their straight portions abutting, while the central layer 3 is composed of a plurality of sectors cut lengthwise of the grain of the wood, the outer layers 2 being also cut lengthwise of the grain, but having their grain running lengthwise to each other. The several sections of layers 2 and 3 are fastened together by tongue and grooves 4, and the several layers are secured together at their periphery by rings 5 sunk in a recess 6 in the outer face of each of the side layers 2, bolts 8 passing through perforation in the said rings and through the several layers of the wood. Or instead of using the rings as above stated, irons 9 having inwardly bent ends 10 may be used, the said ends 10 of each of said irons being driven into the periphery of the outer layers 2 of the wheel, thus holding them against separation, but it is obvious that the rings and irons 9 may be used simultaneously, each aiding the other, and I have so shown them in the accompanying drawings, a suitable tire 11 being shrunk over the periphery of all of said layers.

From the above construction it will be observed that the grain of the wood in two-thirds of the thickness of the wheel always lies in a direction parallel with the radius of the wheel at that point, whereby a heavy load may be carried without distorting the shape of the wheel, the outer layers 2 thereof, the grain of which runs at right-angles to each other, affording a secure casing between which the radial sectors of the inner layer 3 may be clamped.

In order to secure the central portion of the wheel more securely together I prefer to use a hub constructed as follows: A box 13 having an annular flange 14 upon its inner end is inserted through a central aperture 15 in the wheel, the said box having wings 16 thereon extending from the face of the flange to the outer end of the box, which are contained in corresponding recesses in the wheel, the said wings and recesses serving as guides for the insertion of the box and preventing the rotation of the latter within the wheel after it is inserted. A collar 17 having a central aperture 18 is mounted on the projecting outer end of the box, the said collar having recesses 19 therein which receive the wings 16, which thus also serve as means for guiding the collar upon the box and determining its position thereon. The annular flange 14 and the collar 17 have each formed therein at regular intervals a series of perforations 20, through which bolts 21 may be inserted, the said bolts also passing through the thickness of the wheel and serving as means whereby the collar may be drawn toward the flange and tightened upon the wheel. An annular shoulder 22 projects from the outer face of the collar 17 and adapted to inclose the nut 23 upon the axle of the vehicle, the base of the nut being sufficiently large to cover the end of the box and also the annular tread 24 on the collar and each side of the shoulder, the wheel being thus held in place.

Having thus described my invention, what I claim, and desire to secure by Letters Patent, is—

1. A wheel consisting of a plurality of layers, the grain of the alternate layers being at right angles to each other and the intermediate layer consisting of a plurality of sectors cut lengthwise of the grain.

2. A wheel consisting of a plurality of layers, the grain of the alternate layers being at right angles to each other and the intermediate layer consisting of a plurality of sectors cut lengthwise of the grain, the said alternate layers being held together by irons entering the periphery thereof, substantially as described.

3. The combination of a wheel consisting of a plurality of layers, the grain of the alternate layers being at right angles to each other and the intermediate layer consisting of a plurality of sectors cut lengthwise of the grain; perforated ring bearing upon the outer surfaces of the said alternate layers, and bolts passing through the said rings and through the thickness of the wheel, substantially as described.

4. The combination of a wheel consisting of a plurality of layers, the grain of the alternate layers being at right angles to each other and the intermediate layers consisting of a plurality of sectors cut lengthwise of the grain, a box having an annular flange on one end thereof projecting through the wheel thus formed and having wings extending longitudinally along its outer surface, a collar mounted on the said box and having the recesses therein to receive the said wings, and bolts passing through the said collar and flange, and through the thickness of the wheel, whereby the former may be drawn tightly upon the latter, substantially as described.

In testimony whereof I affix my signature in presence of two witnesses.

CHARLES W. ROBINSON.

Witnesses:
   LOU B. WINSOR,
   F. J. O. THACHER.